July 15, 1969  SABURO UEMURA ET AL  3,456,143
SPARK REDUCING ARRANGEMENT FOR COMMUTATOR
BRUSHES OF DC MACHINES
Filed Nov. 17, 1967  2 Sheets-Sheet 1
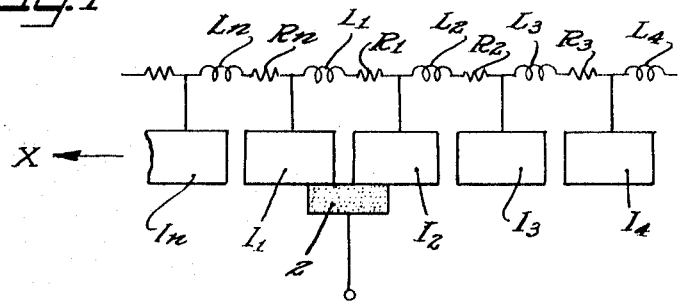
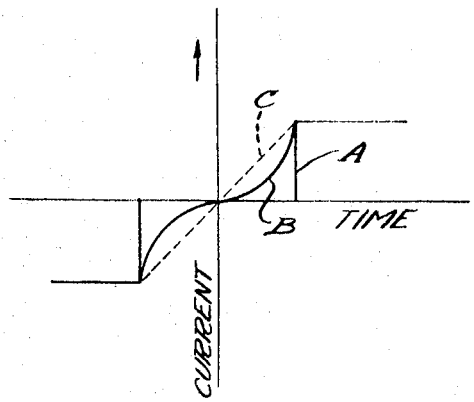
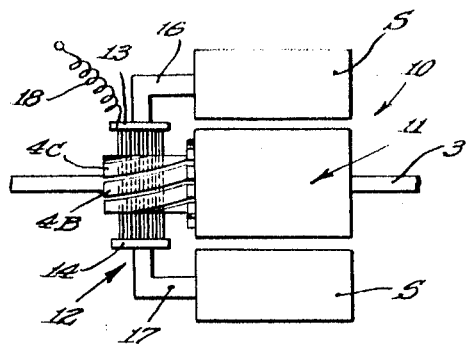
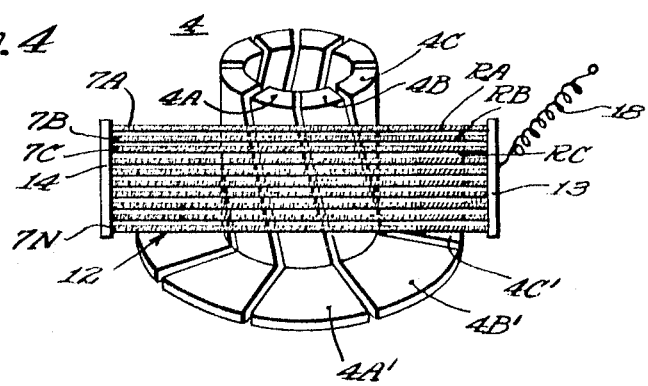
INVENTORS
Saburo Uemura
Hajime Iijima
BY Hill, Sherman, Meroni, Gross & Simpson
ATTORNEYS

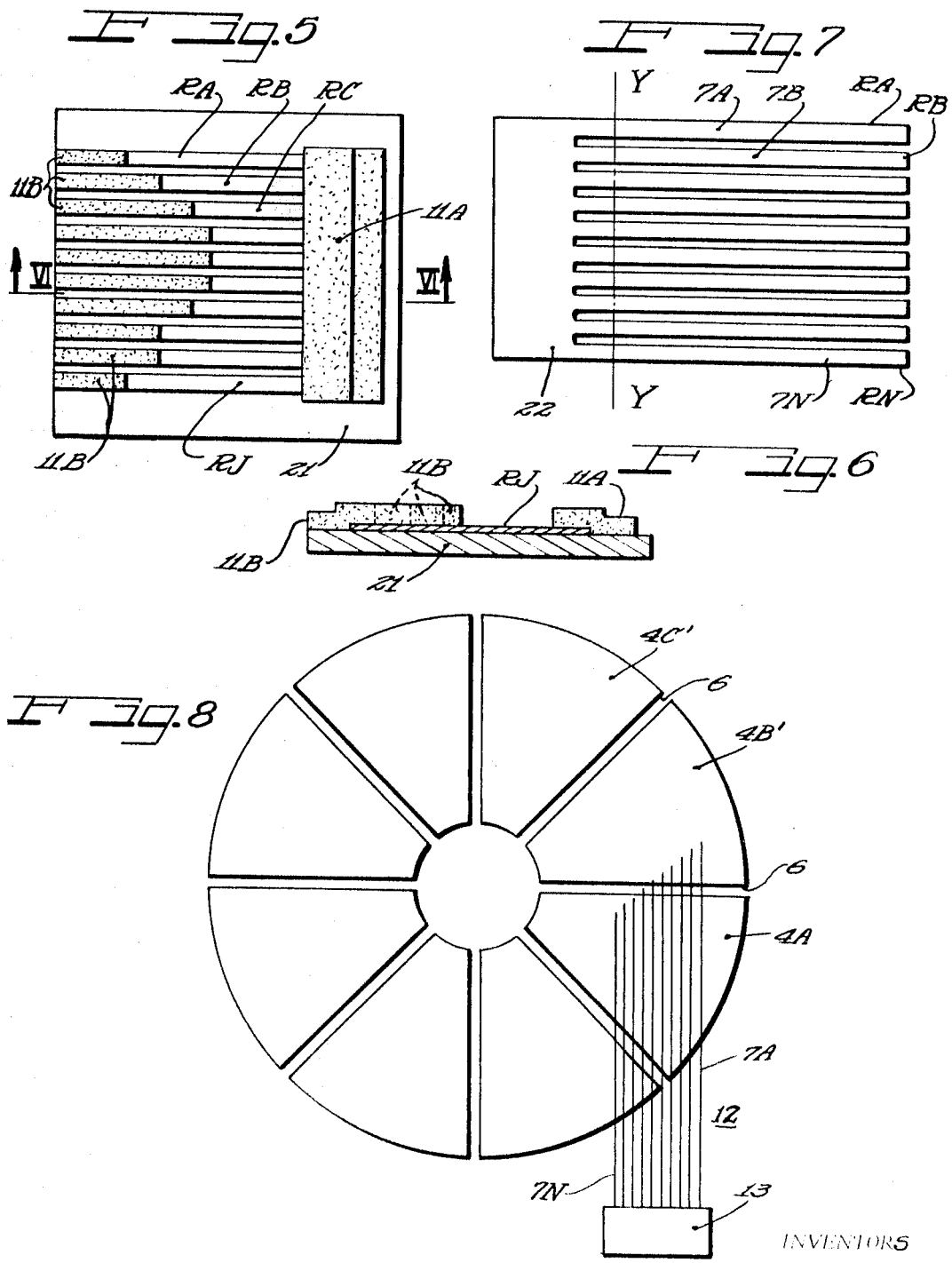

United States Patent Office 3,456,143
Patented July 15, 1969

3,456,143
SPARK REDUCING ARRANGEMENT FOR COMMUTATOR BRUSHES OF DC MACHINES
Saburo Uemura and Hajime Iijima, Kanagawa-ken, Japan, assignors to Sony Corporation, Tokyo, Japan, a corporation of Japan
Filed Nov. 17, 1967, Ser. No. 684,032
Claims priority, application Japan, Nov. 21, 1966, 41/76,496
Int. Cl. H02k 13/10
U.S. Cl. 310—220                                16 Claims

ABSTRACT OF THE DISCLOSURE

A brush structure for direct current machines such as motors which is constructed of a number of parallel brush elements which are in series with resistors of differing values so that sparking at the brushes is substantially eliminated.

BACKGROUND OF THE INVENTION

Field of the invention

In direct current rotating machine which use brushes and commutators a great deal of sparking occurs at the brushes which decreases the efficiency of the machines, causes noise and shortens the life of the commutators and brushes. Such sparking also results in the current varying which causes the speed of a motor to fluctuate.

Description of the prior art

Prior attempts have been made to minimize sparking between brushes and commutators in direct current motors by increasing the contact resistance between commutator segments and the brush and thus avoid spark generation. Commutator segments have been formed of metal such as copper or phosphor bronze and brushes have been formed of material with law conductivity such as carbon or silver-carbon, for example.

However, since the brushes only make several point contacts with each commutator segment when the brushes are formed of these materials, the contact condition becomes unstable as the point contact is shifted rapidly from adjacent commutator segments, and it has been difficult to avoid spark generation by this method.

SUMMARY OF THE INVENTION

Therefore, one of the primary objects of this invention is to provide a DC motor which has little sparking between the brushes and commutator segments.

Another object of this invention is to provide a DC motor with long life.

A further object of this invention is to provide a DC motor which is quiet.

Still another object of this invention is to provide a DC motor with a long life and has constant speed.

Other objects and features of this invention will be apparent from the following description taken in conjunction with the accompanying drawings, wherein:

BRIEF DESCRIPTION OF THE DRAWINGS

FIG. 1 illustrates a conventional rotary commutation device;

FIG. 2 is a graph showing relationships between time and current passing through the coils of rotary commutation devices according to the prior art and this invention;

FIG. 3 illustrates a DC motor equipped with the rotary commutation device according to this invention;

FIG. 4 illustrates an embodiment of the rotary commutation device according to this invention;

FIG. 5 illustrates brushes used in the rotary commutation device according to this invention;

FIG. 6 is a sectional view taken on line VI–VI of FIG. 5;

FIG. 7 illustrates a modification of the invention; and

FIG. 8 is an outlined structure illustrating another embodiment of this invention.

DESCRIPTION OF THE PREFERRED EMBODIMENTS

A conventional rotary commutation device is shown in FIG. 1. Commutator segments $l_1, l_2, l_3 \ldots l_n$ are disposed about the rotary axis of a DC motor with predetermined spaces between adjacent ones. The segments form a ring shape, but in FIG. 1 the segments are arranged on a plane for convenience of explanation. The segments $l_1-l_n$ form a commutator 1. A brush 2 which may be rectangular or round in cross-section engages the commutator 1. Armature windings $L_1, L_2, L_3 \ldots L_n$ are wound around the rotor of the DC motor, and are in series between the commutator segments with internal resistances $R_1, R_2, R_3 \ldots R_n$ of the windings.

In such a structure, if the commutator 1 rotates, as indicated by arrow X, when the brush 2 moves from segment $l_1$ to $l_2$, the winding $L_1$ is short circuited when the brush 2 contacts both commutator segments $l_1$ and $l_2$. Also, the direction of the current is reversed when the contact of the brush 2 is shifted from the commutator segment $l_1$ to $l_2$ completely.

Consequently, if the contact resistance between commutator segments and the brush is small, the current passing through the winding $L_1$ rapidly changes in a stairstep manner as shown by curve A in FIG. 2, thereby causing transient voltages in the winding $L_1$. As a result, at the instance when the brush 2 shifts contact from one commutator segment to an adjacent commutator segment, sparks are generated. Such sparking makes much noise and shortens the life spans of the commutator and brushes.

FIGS. 3 and 4 show a DC motor 10 according to this invention which has a stator S and a rotor 11. Shaft 3 supports the rotor R.

In this invention, two brush members composed of a plurality of brush elements and symmetrically mounted with the commutator inbetween, are positioned so as to make point contact with the commutator. Resistances are connected in series with the plurality of brush elements.

FIGS. 3 and 4 illustrate a motor, designated generally as 10, having a stator S. An armature 11 has a shaft 3 and is rotatably supported in a conventional manner from the frame of the motor. The armature has windings mounted on it which have their ends connected to the commutator 4. The commutator is formed of a number of segments 4A, 4B, 4C ... $4_n$ which have flanges 4A′, 4B′, 4C′ ... $4_n$′, as shown in FIG. 4. The segments 4A ... $4_n$ are spaced from each other so that they are electrically insulated and may be formed to slightly spiral about shaft 3 if desired. The windings $L_1 \ldots L_n$ are attached to the commutator flanges 4A′ ... $4_n$′.

A pair of brushes 12 are supported by the frame of the motor 10 and engage the segments 4A ... $4_n$ of the commutator. Only one of the brushes is illustrated in FIGS. 3 and 4, but it is to be realized that a second brush is mounted on the commutator.

Each brush 12 has end members 13 and 14 which are supported from the stator S by insulating supports 16 and 17. A number of strip-shaped brush elements 7A, 7B, 7C ... 7N extend between end members 13 and 14. A major portion of the brush elements 7A ... 7N are constructed of material with high conductivity such as beryllium copper but the ends RA, RB, RC ... $R_n$ of elements 7A ... 7N adjacent the end member 13 are formed of a material with relatively high resistance which is in series with the elements 7A ... 7N between end members 13 and 14.

The brushes 12 are supported so that each element 7A ... 7N engage the commutator and as the armature rotates each brush element 7A ... 7N is shifted from commutator segment to an adjacent commutator segment.

Current is supplied to the motor through a flexible lead 18 which has one end connected to member 13.

If the resistances RA, RB, RC ... $R_n$ in series with the brush elements are equal, a curve B shown in FIG. 2 is obtained. It is to be noted that curve B produces a more gradual change in coil current than the conventional brush characteristic shown by curve A.

It has also been discovered that if the value of resistance in series $R_A$, $R_B$, $R_C$ ... $R_N$ is varied from the center of the brush to either edge that a straight coil current versus time characteristic may be obtained. This is shown by curve C of FIG. 2. For example, if there are ten brush elements 7A ... 7N, the resistance RA ... RN from one edge to the other could be 40 ohms, 20 ohms, 10 ohms, 5 ohms, zero ohms, zero ohms, 5 ohms, 10 ohms, 20 ohms and 40 ohms. This allows the coil current during the commutation period to be linear as shown by curve C in FIG. 2 which minimizes the transient current and allows spark generation to be effectively avoided.

FIGS. 5 and 6 illustrate one method of forming the brushes 12. A backing plate 21 of insulating material such as a surface-insulated aluminum sheet may be coated with tin oxide to form a resistance coat $R_J$ on the plate 21. The coat $R_J$ may be etched by photo processes, for example, to form resistances RA, RB, RC ... RN.

First ends 11A of the resistances RA, RB, RC ... RN may be coated by silver or other good conductor, as shown. The other ends of RA, RB, RC ... RN may be coated conductive strips 11B. Coating 11A is common to each resistance RA ... RN, but the coating 11B is in series with the resistances to form a brush. It is to be noted that the coatings 11B cover the resistances RA, RB, RC ... RN for different lengths to obtain a resistance variation along the length of the strips as desired.

FIG. 7 shows how the brushes may be formed from a sheet 22 of beryllium-copper of say a thickness of 0.15 mm. The brush elements 7A ... 7N may be formed by etching and by connecting each element to a resistance RA, RB, RC ... RN by soldering or welding with rhodium.

According to this invention, as described above, resistances are connected in series to the corresponding brush elements of the brush 12 and each of the brush elements makes point-contact with each of the commutator segments, thereby causing the point-contact to be shifted in turn from one commutator segment to an adjacent commutator segment. Hence the current passing through windings, as mentioned above, gradually varies with time in a curved or straight line. Consequently, it is possible to minimize the transient voltage of windings wound around the rotor and thereby to avoid generation of sparks effectively. A voidance of spark generation allows the life span of the commutation device to be increased and also stabilizes the operation of the DC motor. In an experiment conducted by these inventors, when this invention was applied to a motor which had a life span of only 1,000 to 1,500 hrs. due to spark generation, a life span of over 3,000 hrs. was obtained.

Although an example of beryllium-copper is given, it is to be realized that any conductible material which possesses abrasion-resisting property and an elasticity and which counteracts spark generation may be used. Also, the invention is applicable where the commutator segments are aligned with shaft 3, rather than being formed spirally as shown in FIGS. 3 and 4.

Also, as shown in FIG. 8, the brush may engage the flanges 4A' ... 4N', and the ends of elements 7A ... 7N may be cut to different lengths, as shown.

The value of resistances RA ... RN can be varied, and brush elements around the center of the element group may not be connected with resistances. Also, many methods may be used to connect the resistances to each brush element. Also, the commutator may be composed of a material having resistance such as sintered substances of carbon and clay.

As explained above, because of the simple structure and effective avoidance of spark generation according to this invention, it is possible to reduce noise production notably and also to easily obtain a commutation system enjoying a long life.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

We claim:
1. A DC motor comprising;
   a stator having plural poles,
   a rotor having an armature and armature windings wound on said armature,
   a commutator rotated with said rotor having plural commutator segments separated with a predetermined space, each of said commutator segments being connected to each of said armature windings,
   a pair of brushes having respectively a plurality of electrically separated brush elements, said elements being in point contact with said commutator segments, and means for applying different amounts of current through each of said brush elements to prevent sparks between said commutator and brush elements.

2. In a direct current rotating machine having a stator and an armature formed with a commutator having segments on the armature, a brush structure comprising,
   a plurality of conductive members engageable with the segments of the commutator and a first end of the conductive member electrically connected together at a common point and having variable resistance so that certain conductive members carry more current than others.

3. In apparatus according to claim 2, a plurality of resistive portions forming parts of the conductive members between the common point and the points of engagement of the conductive members with the segments of the commutator.

4. Apparatus according to claim 3, a first end member of electrical conductive material connected to the conductive members at the common point.

5. Apparatus according to claim 4, a second end member connected to the other ends of the conductive members and the commutator engageable with the conductive members between the first and second end members.

6. Apparatus according to claim 3 wherein the conductivity of the conductive members vary.

7. Apparatus according to claim 6 wherein the conductivity of the conducting members is higher in the center ones than in the ones adjacent the edges.

8. Apparatus according to claim 7 wherein the conductivity of the conducting members varies from a low value on each edge to a high value in the center of the brush structure.

9. Apparatus according to claim 2, first support means attached to the brush structure to support it so that the conductive members are held to engage the segments of the commutator.

10. Apparatus acocrding to claim 9, a second support means attached to one end of the brush structure to support it from the stator and the first support means attached to the stator.

11. Apparatus according to claim 9 wherein the segments of the commutator extend generally longitudinally of the armature and the brush structure is supported so that the conductive members extend generally transversely of the armature.

12. Apparatus according to claim 9 wherein the segments of the commutator spiral generally in the longitudinal direction of the armature and the brush structure is supported so that the conductive members extend generally transversely of the armature.

13. Apparatus according to claim 3 wherein the segments of the commutator are formed with flange portions extending generally radial of the armature and the conductive members are engageable with the flange portions of the segments of the commutator.

14. Apparatus according to claim 2 wherein each conductive member is formed of a first portion of relatively high conductivity and a second portion in series with the first portion and havng relatively lower conductivity than the first porton.

15. The method of forming a brush comprising a plurality of conductive members which extend parallel to each other and are joined together at one end thereof to form a common point and which have varying conducitvity between the common point and an engagement area consisting of forming a plurality of resistive parallel strips on an insulating support member, applying a first conductive layer to the ends of the strips at the common point and applying a plurality of conductive layers on the resistive parallel strips between the common point and the engagement area.

16. The method according to claim 15 wherein the plurality of resistive parallel strips are formed by etching.

References Cited

UNITED STATES PATENTS

| | | | |
|---|---|---|---|
| 1,453,410 | 5/1923 | Slepian | 310—220 |
| 1,464,123 | 8/1923 | Whitaker | 310—220 |
| 3,322,988 | 5/1967 | Ishikawa | 310—220 |
| 3,381,210 | 4/1968 | Shano | 310—220 |

WARREN E. RAY, Primary Examiner

R. SKUDY, Assistant Examiner

U.S. Cl. X.R.

310—252